(12) United States Patent
Smyrl et al.

(10) Patent No.: US 8,281,281 B1
(45) Date of Patent: Oct. 2, 2012

(54) SETTING LEVEL OF DETAIL TRANSITION POINTS

(75) Inventors: Eliot Smyrl, Oakland, CA (US); Martin Reddy, San Francisco, CA (US)

(73) Assignee: Pixar, Emeryville, CA (US)

( * ) Notice: Subject to any disclaimer, the term of this patent is extended or adjusted under 35 U.S.C. 154(b) by 1717 days.

(21) Appl. No.: 11/521,644

(22) Filed: Sep. 14, 2006

Related U.S. Application Data (60) Provisional application No. 60/811,881, filed on Jun. 7, 2006.

(51) Int. Cl.
G06F 9/44 (2006.01)
G06T 17/00 (2006.01)
G06G 5/00 (2006.01)

(52) U.S. Cl. ........ 717/105; 717/108; 717/109; 717/113; 345/428; 345/581; 345/619

(58) Field of Classification Search .................. None
See application file for complete search history.

(56) References Cited

U.S. PATENT DOCUMENTS

| | | | | |
|---|---|---|---|---|
| 5,367,615 A * | 11/1994 | Economy et al. | ............. | 345/441 |
| 5,426,730 A * | 6/1995 | Miyake et al. | ................. | 715/839 |
| 5,448,686 A * | 9/1995 | Borrel et al. | ................. | 345/420 |
| 5,692,117 A * | 11/1997 | Berend et al. | ................. | 345/475 |
| 5,831,625 A * | 11/1998 | Rich et al. | ..................... | 345/587 |
| 5,852,449 A * | 12/1998 | Esslinger et al. | ............. | 345/473 |
| 6,028,608 A * | 2/2000 | Jenkins | .......................... | 345/619 |
| 6,084,590 A * | 7/2000 | Robotham et al. | ............ | 345/419 |
| 6,104,842 A * | 8/2000 | Rich | ............................. | 382/304 |
| 6,124,864 A * | 9/2000 | Madden et al. | ................ | 345/473 |
| 6,160,907 A * | 12/2000 | Robotham et al. | ............ | 382/154 |
| 6,262,724 B1 * | 7/2001 | Crow et al. | .................... | 715/723 |
| 6,263,339 B1 * | 7/2001 | Hirsch | ................................. | 1/1 |
| 6,300,956 B1 * | 10/2001 | Apodaca et al. | .............. | 345/619 |
| 6,343,265 B1 * | 1/2002 | Glebov et al. | .................... | 703/25 |
| 6,396,500 B1 * | 5/2002 | Qureshi et al. | ................ | 345/473 |
| 6,400,372 B1 * | 6/2002 | Gossweiler et al. | .......... | 345/619 |
| 6,639,599 B2 * | 10/2003 | Pope et al. | ..................... | 345/428 |
| 6,834,390 B2 * | 12/2004 | Miller et al. | ................... | 719/322 |
| 6,873,342 B2 * | 3/2005 | Perry et al. | ..................... | 345/645 |
| 6,915,301 B2 * | 7/2005 | Hirsch | ........................... | 717/100 |
| 7,042,454 B1 * | 5/2006 | Seligman | ....................... | 345/428 |

(Continued)

OTHER PUBLICATIONS

Luebke et al., Level of detail for 3D graphics, published by Morgen Kaufmann Publishers, 2003, pp. 1-390.*

(Continued)

*Primary Examiner* — Tuan Q Dam
*Assistant Examiner* — Zheng Wei
(74) *Attorney, Agent, or Firm* — Kilpatrick Townsend & Stockton, LLP; Philip H. Albert (57) ABSTRACT

Visual representations of different versions of an object are automatically generated and presented to users. Users can compare these visual representations to determine appropriate level of detail transition points based on the visual appearances of different versions of an object. The specified level of detail transition points are converted into level of detail parameter values to be used to select one or more versions of an object for rendering, simulation, or other tasks. The visual representation of each version of an object can include an image sequence of the version at a range of distances from the camera. Each image corresponds to a view of the version at a specific level of detail parameter value. A user interface allows users to view the image sequences associated versions of an object as still images or animation. Users can select images in image sequences as level of detail transition points.

42 Claims, 5 Drawing Sheets

U.S. PATENT DOCUMENTS

| | | | |
|---|---|---|---|
| 7,558,320 B2* | 7/2009 | Winder et al. | 375/240.12 |
| 7,664,327 B2* | 2/2010 | Bober | 382/203 |
| 7,830,380 B2* | 11/2010 | Ahn et al. | 345/428 |
| RE42,287 E * | 4/2011 | Apodaca et al. | 345/619 |
| 8,115,763 B2* | 2/2012 | Woop et al. | 345/420 |
| 2002/0012002 A1* | 1/2002 | Ito | 345/552 |
| 2002/0059293 A1* | 5/2002 | Hirsch | 707/103 R |
| 2003/0146918 A1* | 8/2003 | Wiles et al. | 345/582 |
| 2004/0100473 A1* | 5/2004 | Grzeszczuk et al. | 345/581 |
| 2004/0130680 A1* | 7/2004 | Zhou et al. | 352/38 |
| 2005/0044499 A1* | 2/2005 | Allen et al. | 715/704 |
| 2005/0125826 A1* | 6/2005 | Hunleth et al. | 725/45 |
| 2006/0109274 A1* | 5/2006 | Alvarez et al. | 345/473 |
| 2006/0112114 A1* | 5/2006 | Yu et al. | 707/100 |
| 2008/0063312 A1* | 3/2008 | Bober | 382/305 |
| 2008/0266300 A1* | 10/2008 | Deering et al. | 345/502 |

OTHER PUBLICATIONS

Vedula et al., Modeling, Combining, and Rendering Dynamic Real-World Events From Image Sequences, published in 1998, pp. 1-7.*
Lindstrom, Peter and Turk, Greg, "Image-Driven Simplification," ACM Transactions on Graphics, Jul. 2000, pp. 204-241, vol. 19, No. 3.

* cited by examiner

SETTING LEVEL OF DETAIL TRANSITION POINTS

CROSS-REFERENCES TO RELATED APPLICATIONS

This application claims benefit under 35 USC 119(e) of U.S. Provisional Patent Application No. 60/811,881, filed Jun. 7, 2006, entitled "Automatic Level of Detail," which is incorporated by reference herein.

BACKGROUND OF THE INVENTION

The present invention relates to the field of computer graphics, and in particular to methods and apparatus for creating, modifying, and using lights and other components to control the attributes and appearance of objects in computer graphics images. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Rendering is often computationally expensive, in terms of the amount of both computations and memory required. Typically, the computational expense of rendering increases with increased complexity of the scene.

To improve rendering efficiency and reduce the computational cost of rendering, it is desirable to minimize the complexity of scenes where possible. One approach to achieving this end uses multiple versions of objects of varying complexity in rendering. This approach, referred to as level of detail, substitutes less complicated versions of an object during rendering when the viewer is not likely to notice any differences, such as when the object is distant or partially hidden from the camera viewpoint. Similarly, computer simulations and animation systems may also employ less detailed versions of objects and/or simplified algorithms when the viewer is less likely to notice any differences from the more complicated version of the object and/or algorithm.

There are a variety of different level of detail rendering algorithms used to select and render the appropriate version of an object. Typically, these algorithms strive to reduce rendering computational costs and maintain the overall visual quality. Additionally, these algorithms strive to hide or minimize any abrupt visual discontinuities when switching between different levels of detail of an object. In some types of level of detail algorithms, a user manually specifies a transition point between different level of detail models of an object. The renderer uses these user-defined transition points to select the appropriate version of an object during rendering.

Previously, users would be required to specify level of detail transition points in terms of abstract parameter values, such as the distance from the camera at which to switch between two different versions of an object or the number of pixels covered by a projection of the object or of a bounding box of the object. Users would have to rely on their intuition to set these parameter values appropriately. Also, users would often spend considerable amounts of time fine-tuning the values of these parameters to ensure visually satisfactory results.

It is desirable for a system and method to facilitate the specification of transition points between different versions of objects. It is further desirable for the system and method to enable users to specify visually satisfactory transition point values without requiring considerable fine-tuning. It also desirable for the system and method to be applicable to a wide variety of different types of level of detail, rendering, animation, and simulation algorithms.

BRIEF SUMMARY OF THE INVENTION

An embodiment of the invention automatically generates visual representations of different versions of an object. Users can compare these visual representations to determine appropriate level of detail transition points. Users can specify level of detail transition points based on the visual appearances of different versions of an object. This embodiment then converts the level of detail transition points specified by the user into level of detail parameter values to be used by a renderer to select one or more versions of an object for rendering.

In an embodiment, the visual representation of each version of an object can include image sequences of the version of the object at a range of distances from the camera. Each image corresponds to a view of the version of the object at a specific level of detail parameter value. The level of detail parameter value can be based on the proportion of the image covered by the version of the object or an approximation thereof, such as a bounding box or bounding sphere.

An embodiment of a user interface allows users to view the image sequences associated versions of an object. Image sequences can be viewed as still images or animation. Users can switch between corresponding images in image sequences associated with different version of an object to compare the visual appearance of different versions of the objects. Users can select images in image sequences as level of detail transition points. An embodiment uses these specified level of detail transition points to determine level of detail parameter values.

BRIEF DESCRIPTION OF THE DRAWINGS

The invention will be described in reference to the drawings, in which.

DETAILED DESCRIPTION OF THE INVENTION

Figure 1:
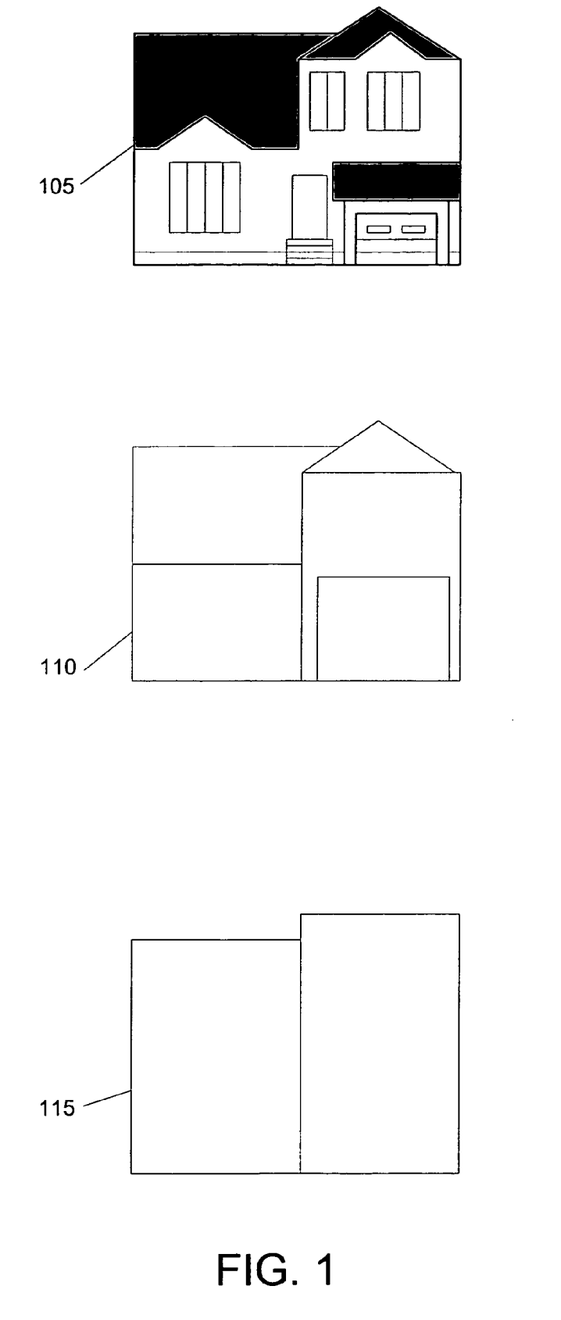
FIG. 1 illustrates example versions of an object at different levels of detail suitable for use with embodiments of the invention.

FIG. 1 illustrates example versions of an object at different levels of detail suitable for use with embodiments of the invention. In this example, the object is a three-dimensional model of a house. A first version 105 of the object is a model of the house with a large amount of complexity. In this example, version 105 of the object includes complex geometric features such as doors and windows. In some applications, version 105 may also include high resolution texture maps and complicated shader programs to specify the color and other optical properties of its surface.

A second version 110 of the object has less complexity than version 105. In this example, the version 110 of the house object omits many of the details present in version 105. In some applications, the shapes of features in version 105 of the object may be changed to less complex approximations in version 110 of the object. In some applications, optional texture maps and shader programs associated with version 110 may be less detailed and complicated than their counterparts in version 105 of the object.

Similarly, a third version 115 of the object may have less complexity than version 110. In this example, version 115 of the object has been reduced to a few basis shapes. Version 115 of the object can include a subset of the geometry of versions 105 and 110 and/or modified geometry approximating the geometry of versions 105 and 110. Version 115 may also include optional texture maps and shader programs of low detail and complexity.

There are a variety of different level of detail techniques for creating versions of objects of varying complexity. For example, an initial, complex version of an object may be processed using simplification algorithms to automatically generate one or more less complicated versions of the object. Mesh simplification is one type of simplification algorithm. Users can also manually reduce the complexity of a version of an object to create a lower detail version of the object. Users may further manually create multiple versions of the object independently. Objects may be modeled procedurally or parametrically in such a way as to allow for multiple versions of the object to be created automatically. Level of detail techniques can be used to create any arbitrary number of versions of objects.

In some applications, different versions of an object share the same geometry but have texture maps and shader programs of varying complexity. In other applications, the different versions of the object have different geometry and different texture maps and shader programs. In some applications, a less geometrically complex version of an object may include more complex texture maps and shader programs than a more geometrically complex version of the object, to compensate for the reduction in geometry. For example, a less geometrically complex version of an object may use complicated bump mapping or parallax mapping shader programs to approximate the appearance of a more geometrically complex version of the object.

In an example application, a renderer may use version 105 of the object when rendering the object close-up, version 110 of the object when rendering the object from a medium distance, and version 115 of the object when rendering the object from far away. As discussed above, some level of detail rendering algorithms allow users to specify criteria for switching between different versions of the object. For example, users can specify the transition point between two different versions of an object in terms of distance from the camera, the number of pixels covered by a projection of the object (or the projection of an approximation of the object, such as a bounding box, bounding sphere, or convex hull), or any other type of parameter.

In some applications, the renderer renders and blends two different versions of an object together to prevent visual discontinuities when switching between different versions of the object. In these applications, the renderer uses one or more specified transition points to determine the proportions used to blend two versions of the object. For example, two transitions points may define a blending region, in which a level of detail transition begins when an object's bounding box covers a first number of pixels and ends when the object's bounding box covers a second number of pixels. When the object is within the blending region, such as when the bounding box of the object covers any number of pixels between the first and second numbers, the renderer renders both versions of the object. The renderer then blends the different versions of the object in proportion to the object's location in the blending region. This blending can be done in the image, for example by blending pixels or sub-pixel samples of the versions of the object, or geometrically, for example by blending polygons, micropolygons, or other geometric features of versions of the object.

Rather than requiring users to specify level of detail transition points in terms of abstract parameter values, an embodiment of the invention automatically generates visual representations of different versions of an object. Users can compare these visual representations to determine appropriate level of detail transition points. Users can specify level of detail transition points based on the visual appearances of different versions of an object.

Figure 2:
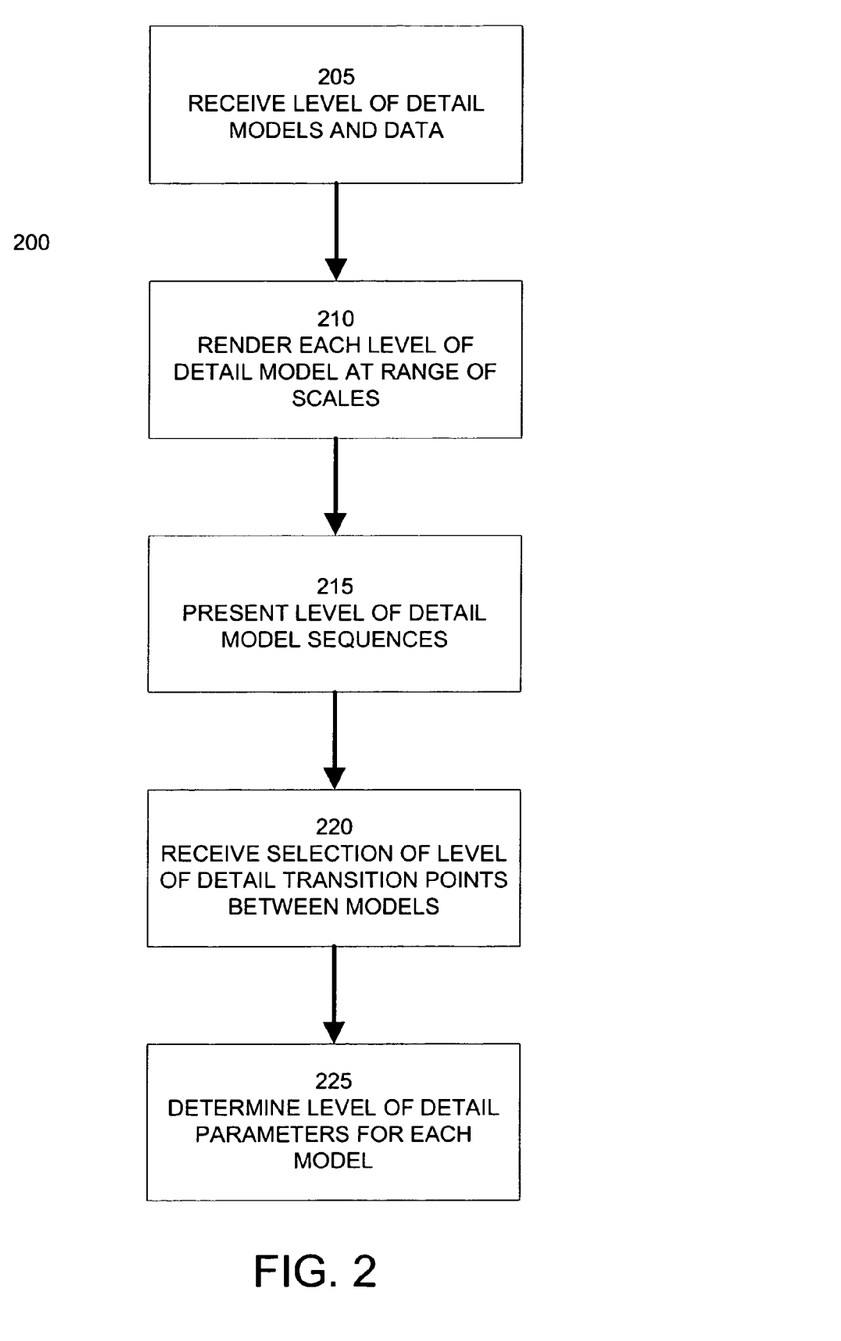
FIG. 2 illustrates a method of facilitating the specification of transition points between different versions of an object according to an embodiment of the invention.

FIG. 2 illustrates a method 200 of facilitating the specification of transition points between different versions of an object according to an embodiment of the invention. Step 205 receives a set of models representing different versions of an object. As described above, the different versions of an object can be created manually or automatically and may include associated texture maps and shader programs. Step 205 can receive from two to any arbitrary number of versions of an object. In a further embodiment, step 205 may also receive additional data for the object to be used by the renderer in selecting the appropriate version of the object. Examples of this additional data can include specifications of a bounding box, bounding sphere, or other approximation of one or more versions of the object.

Step 210 determines a visual representation of each version of the object. In an embodiment, step 210 renders a sequence of images of each version of the object at a range of different distances from the camera. In an embodiment, the range distances may be specified explicitly as any arbitrary values. For example, step 210 may render images of each version of the object from 1 meter to 100 meters from the camera in 1 meter increments. In another embodiment, the range of distances at which the version of the object is rendered is determined from the number of pixels covered by a projection of the object or its approximation, such as a bounding box, bounding sphere, or other bounding volume. For example, step 210 may render a sequence of images of each version of the object where the object's associated projection ranges in size from 1 pixel up to N pixels in increments of 1 or more pixels, where N is any arbitrary integer greater than 1.

Step 210 may utilize any rendering technique known in the art to create a sequence of images for each version of the object. In an embodiment, each version of the object is rendered in a default orientation. In another embodiment, each version of the object is rendered in an orientation provided by a user or another software application.

Step 215 presents the sequences of images of versions of the object to a user via a user interface. In an embodiment, users can view the sequence of images associated with each version of an object as an animated sequence. Users can perform any action typically associated with viewing animated sequences, such as playing forwards or backwards, pausing, and stepping through a single frame at a time. While viewing the sequence of images associated with a version of the object, an embodiment of the invention enables a user to switch the view to another version of the object. In an embodiment, the user interface enables users to cycle through the corresponding images of different versions of an object to visually compare the appearance of different versions at a given level of detail. In a further embodiment, the user interface may present two or more different sequences of images associated with different versions of the object to the user simultaneously.

Based upon the visual appearance of versions of an object, the user can specifying transition points between different versions of the object. In an embodiment, the user specifies a transition point between two different versions of an object by selecting one of the images in a version's associated sequence of images as a transition point between that version and another version of the object. The user may repeat this selection process as many times as necessary to specify transition points between all of the different versions of an object. In general, if there are N different versions of an object, the user typically specifies N−1 transition points. In a further embodiment, the user interface presents to the user a composite sequence of images created from the combination of portions of each version's sequence of images, with each portion defined by the user-specified transition points.

Step 220 receives the transition points specified by the user. Step 225 determines the appropriate level of detail parameter values for the versions of the object from these transition point selections. Step 225 then outputs these level of detail parameter values to a data file or other entity to be stored in association with the different versions of the object. The renderer then uses these level of detail parameter values in conjunction with its level of detail algorithm to improve rendering performance of the object.

For example, if the user specifies the 25th image in a sequence of images as the transition point between two different versions of an object, step 225 will determine the appropriate level of detail parameter values from this selection. If the level of detail algorithm is based upon the distance of the object from the camera, then step 225 will determine the camera distance value associated with the image that is selected by the user as the transition point. Similarly, if the level of detail algorithm is based upon pixel coverage by a projection of the object, then step 225 will determine the pixel coverage value associated with the image selected by the user as the transition point.

In another example, the user specified level of detail transition points are used to refine or calibrate a metric of level of detail quality. For example, a metric of level of detail quality may be the root mean square difference between images of different versions of an object. Other metrics used for level of detail analysis include simplification envelopes, texture deviation metrics, and perceptual and frequency domain analysis. The value of this metric corresponding with the user specified transition point is used to calibrate the metric of level of detail quality. During subsequent renderings of the object, the value of the calibrated level of detail metric of the object is computed and used to determine the optimal version of the object to display.

In some embodiments, the parameter value can be determined directly from the location of the image within its sequence. For example, if the sequence of images represents a range of pixel coverage values from 1 to N in increments of 1 pixel, then the parameter value of an image is the same as its location within a sequence. Similar formulas can be derived for more complicated sequences of images.

In other embodiments, the level of detail parameter values may derived from the contents of the image or other factors, rather than just the image's location in a sequence. In these embodiments, step 210 may determine and store a level of detail value in association with each image of each sequence. Step 225 may then retrieve the level of detail parameter value previously stored with the image selected by the user. In still further embodiments, the level of detail parameter value may be based on a combination of factors, including distance of the object from the camera; pixel coverage of the object or an approximation of the object; priority of the object, so that the object is presented at higher levels of detail than other objects with lower priority; and hysteresis effects, so that level of detail transition points when changing from high detail to low detail are different than when changing from low detail to high detail.

In a further embodiment, method 200 can render image sequences at interactive frame rates. In this embodiment, method 200 may present images of different versions of an object simultaneously. The user may adjust the level of detail transition points or parameter values for one or more versions of the objects, with the results being displayed immediately. When the images of two or more versions of an object look sufficiently similar to the user, the user can select the current level of detail parameter values to be used. This embodiment of method 200 can be used with discrete level of detail techniques, in which each version of an object is separately modelled, or with continuous level of detail techniques, in which the geometry and other features of an object can be continuously modified to create versions with different amounts of detail.

Figure 3A:
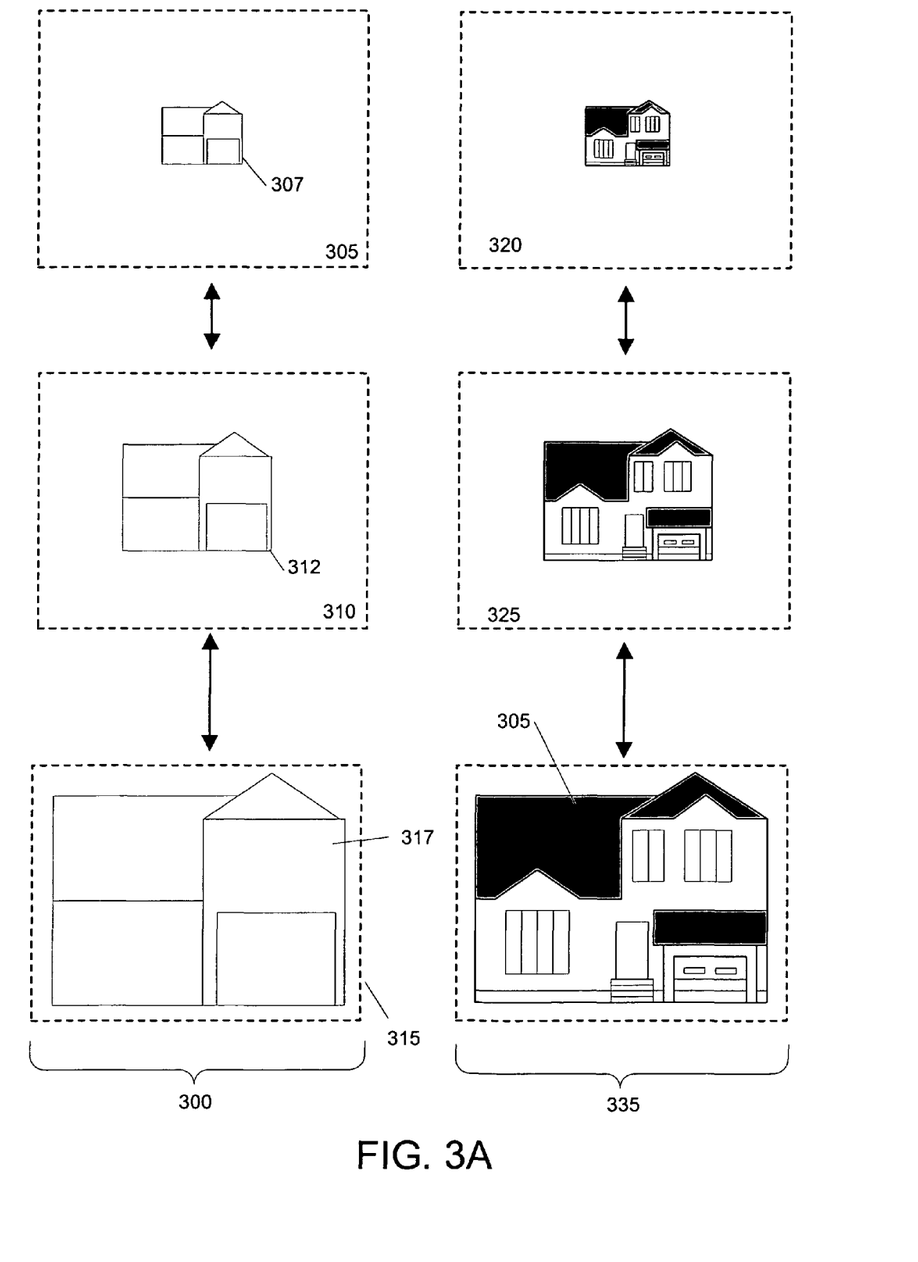
FIGS. 3A-3B illustrate an example application of an embodiment of the invention.
Figure 3B:
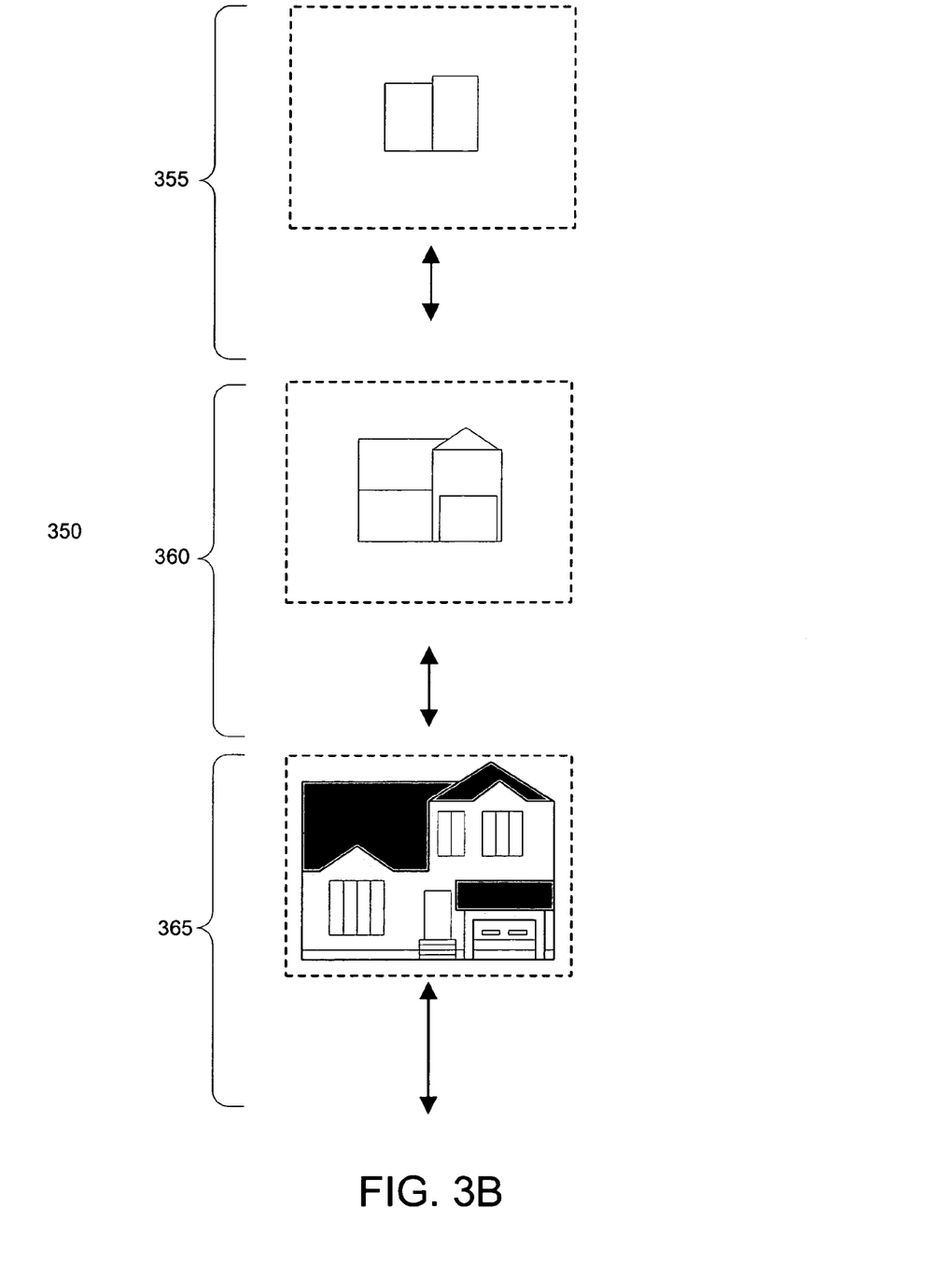

FIGS. 3A-3B illustrate an example application of an embodiment of the invention. FIG. 3A illustrates two example image sequences created and presented to users by an embodiment of method 200. In this example, image sequence 300 includes a plurality of images of a first version of an object. Image sequence 300 includes images of the first version of the object covering a range of different pixels. For example, the rendering 307 of the object in image 305 covers a very small number of pixels. The renderings 312 and 317 of the object in images 310 and 315, respectively, cover larger numbers of pixels in their images. Similarly, image sequence 335 includes a plurality of images of a second version of the object, including images 320, 325, and 330.

As discussed above, users can view each version's image sequence in a variety of different ways and can switch between corresponding images in different sequences. For example, a user can switch views between corresponding images 305 and 320, between images 310 and 325, and between images 315 and 330. By evaluating the visual appearance of different versions of the object in corresponding images, users can determine the most appropriate version of the object to be used when rendering the object at a particular size.

For example, a user might decide, that the visual differences between the two versions of the object are negligible when the rendered object is smaller than that shown in images 310 and 325. Thus, the user might select the transition point between the first and second versions of the object at image 310. As a result, the renderer will use the first version of the object, which is less complicated, when the size of the rendered object will be less than that shown in images 310 and 325. Conversely, the renderer will use the second version of the object, which is more complicated, when the size of the rendered object is greater than that shown in images 310 and 325. Alternatively, the renderer may use the transition point to determine the amount of blending between the first and second version of the object.

FIG. 3B illustrates an example composite image sequence 350 created from the combination of images sequences of different versions of an example object. Composite image sequence 350 includes portions of the image sequences of three different versions of the object. Portion 355 is associated with a first, low-complexity version of the object. Portion 360 is associated with a second, medium-complexity version of the object. Portion 365 is associated with a third, high-complexity version of the object. The portions of composite image sequence 350 are defined by users' selection of level of detail transition points.

By presenting composite image sequence 350 to users, an embodiment enables users to visually preview their selection of level of detail transition points. In an embodiment, users can view composite image sequence 350 as still images or an animated sequence and may be able to play, pause, or step through composite image sequence 350. If users are satisfied with the selection of level of detail transition points, this selection can be provided to an embodiment of the invention to specify the appropriate level of detail parameter values, as described above. Users may also modify their selection of level of detail transition points as often as necessary until a satisfactory selection is determined.

Embodiments of the invention can assist users in setting any type of attribute that depends on the size of an object in an image. As described above, embodiments of the invention can specify level of detail transition points for selecting between different versions of an object. Additionally, embodiments of the invention can be used to vary the type and parameters of functions specifying the appearance or behavior of a version of an object as the object's size in an image changes, including shader programs, simulations, and procedural geometry and textures. This can be used, for example, so that as an object decreases size in an image, shader programs perform less complicated calculations or simulation programs perform simulations on less complicated objects and/or use less complicated algorithms. In another example, procedurally generated and/or animated vegetation or hair systems may reduce their complexity when they are further from the camera. For example, a hair system that procedurally generates and/or animates hair or fur on an object can decrease the density and/or complexity of hairs when the object is further away.

Figure 4:
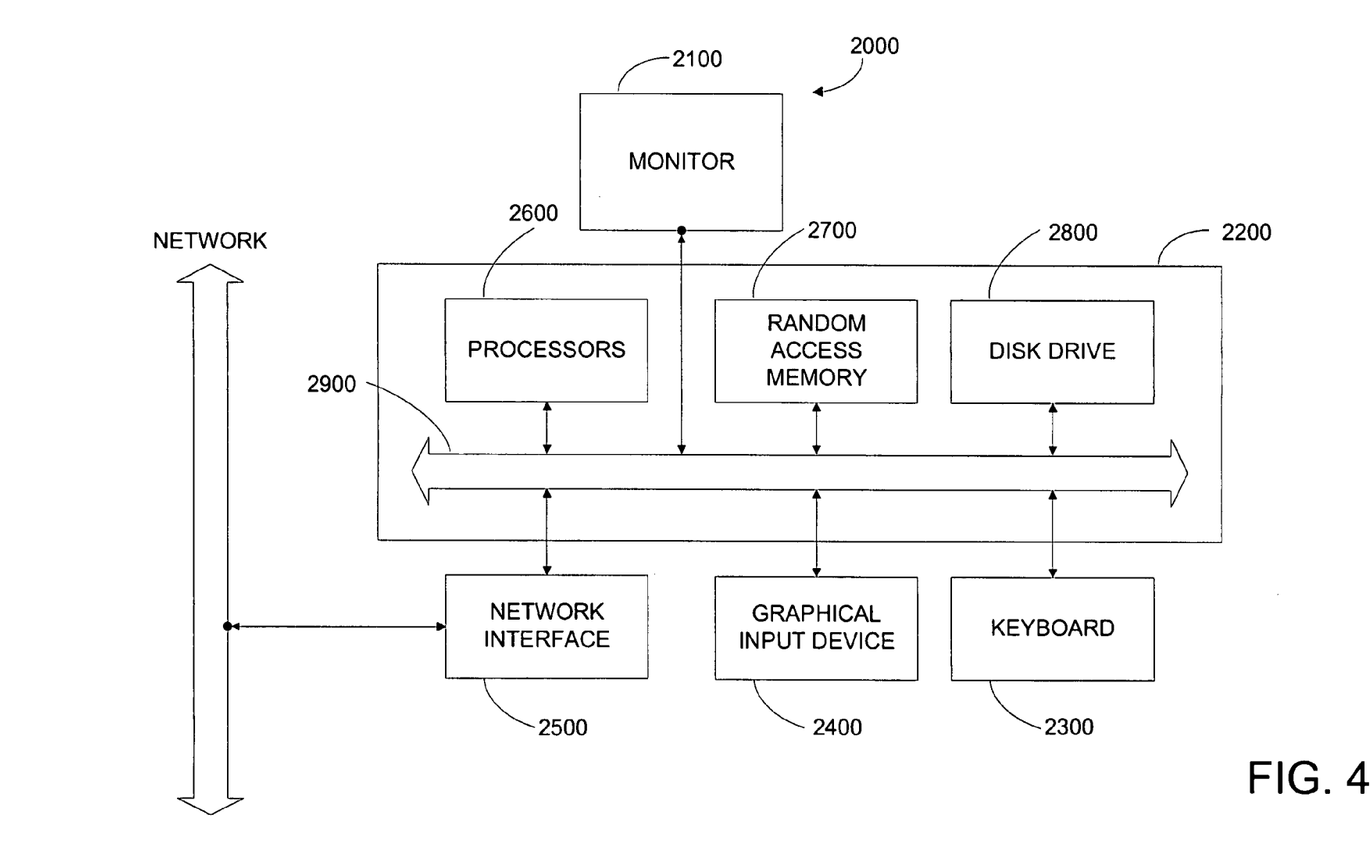
FIG. 4 illustrates a computer system suitable for implementing an embodiment of the invention.

FIG. 4 illustrates a computer system 2000 suitable for implementing an embodiment of the invention. Computer system 2000 typically includes a monitor 2100, computer 2200, a keyboard 2300, a user input device 2400, and a network interface 2500. User input device 2400 includes a computer mouse, a trackball, a track pad, graphics tablet, touch screen, and/or other wired or wireless input devices that allow a user to create or select graphics, objects, icons, and/or text appearing on the monitor 2100. Embodiments of network interface 2500 typically provides wired or wireless communication with an electronic communications network, such as a local area network, a wide area network, for example the Internet, and/or virtual networks, for example a virtual private network (VPN).

Computer 2200 typically includes components such as one or more processors 2600, and memory storage devices, such as a random access memory (RAM) 2700, disk drives 2800, and system bus 2900 interconnecting the above components. Processors 2600 can include one or more general purpose processors and optional special purpose processors for processing video data, audio data, or other types of data. RAM 2700 and disk drive 2800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of determining level of detail parameters for a selection of at least one of a plurality of versions of an object, the object being representable in an image, and the method comprising:
    generating a plurality of image sequences, wherein each of the plurality of image sequences is an image sequence corresponding with a particular version of the object from among the plurality of versions of the object, and wherein an image sequence of the plurality of image sequences comprises images that are a view of the version of the object associated with that image sequence and a level of detail parameter value corresponding to that image sequence;
    presenting the plurality of image sequences to a user;
    accepting, from the user, an indication of one or more sequence transition points, wherein a sequence transition point corresponds to a position within one or more sequences that is a user-selected point of transition between one image sequence and another image sequence; and
    converting at least one of the indications of one or more sequence transition points to a level of detail parameter, wherein the level of detail parameter corresponds to a sequence transition point, thereby defining a desired transition between one version of the object and another version of the object, wherein the level of detail parameter values are adapted to be used to select at least one of the plurality of versions of the object.

2. The method of claim 1, wherein presenting the plurality of image sequences to the user comprises displaying each of the image sequences as an animation.

3. The method of claim 2, further comprising:
    receiving user input while presenting the image sequences to the user; and
    modifying the animation of the image sequences in response to the user input.

4. The method of claim 3, further comprising pausing the animation in response to a user input.

5. The method of claim 3, further comprising stepping through the animation in response to a user input.

6. The method of claim 3, further comprising:
    displaying at least a portion of a first one of the plurality of image sequences corresponding with a first one of the plurality of versions of the object;
    displaying at least a portion of a second one of the plurality of image sequences corresponding with a second one of the plurality of versions of the object in response to the user input, wherein at least one image of each of the portions of the first and second ones of the image sequences are associated with the same level of detail parameter value.

7. The method of claim 2, further comprising:
in response to receiving the indication of one or more sequence transition points from the user, presenting a composite image sequence to the user, wherein the composite image sequence includes a first portion of a first one of the image sequences corresponding with a first one of the plurality of versions of the object and a second portion of a second one of the image sequences corresponding with a second one of the plurality of versions of the object, wherein the first and second portions are specified by the indication of one or more sequence transition points.

8. The method of claim 1, wherein converting comprises:
identifying images in the image sequences specified by the indication of one or more sequence transition points; and
determining the level of detail parameter values associated with each identified image.

9. The method of claim 8, wherein the level of detail parameter value associated with each identified image is related to a position of the identified image in its image sequence.

10. The method of claim 8, wherein the level of detail parameter value associated with each identified image is related to content of the identified image.

11. The method of claim 8, wherein determining a level of detail parameter value associated with each image comprises comparing images of at least two versions of the object corresponding with the indication of one or more sequence transition points to calibrate a level of detail quality metric.

12. The method of claim 8, wherein the level of detail parameter value of each image is related to the proportion of the image covered by the associated version of the object in the image.

13. The method of claim 8, wherein the level of detail parameter value of each image is the proportion of the image covered by an approximation of the associated version of the object in the image.

14. The method of claim 8, wherein the level of detail parameter value of each image is related to a distance from the associated version of the object to a predetermined location.

15. The method of claim 14, wherein the distance is defined from a point on the associated version of the object to a camera location associated with the view in the image.

16. The method of claim 1, wherein the level of detail parameter values are adapted to direct a renderer to select one of the plurality of versions of the object for rendering.

17. The method of claim 1, wherein the level of detail parameter values are adapted to direct a renderer to blend two or more of the plurality of versions of the object.

18. The method of claim 17, wherein the level of detail parameter values specify at least one blending region.

19. The method of claim 1, wherein the level of detail parameter values are adapted to be used by a renderer in conjunction with a desired level of detail value to select at least one of the plurality of versions of the object for rendering.

20. The method of claim 19, wherein the level of detail parameter values specify at least one input parameter to a function specifying the appearance of at least one of the plurality of versions of the object.

21. The method of claim 1, wherein the level of detail parameter values are adapted to be used by a simulation system in conjunction with a desired level of detail value to select at least one of the plurality of versions of the object for simulation.

22. A non-transitory computer-readable storage medium including instructions adapted to direct a computer to perform an operation of determining level of detail parameters, comprising:
generating a plurality of image sequences, wherein each of the plurality of image sequences is an image sequence corresponding with a particular version of the object from among the plurality of versions of the object, and wherein an image sequence of the plurality of image sequences comprises images that are a view of the version of the object associated with that image sequence and a level of detail parameter value corresponding to that image sequence;
presenting the plurality of image sequences to a user;
accepting, from the user, an indication of one or more sequence transition points, wherein a sequence transition point corresponds to a position within one or more sequences that is a user-selected point of transition between one image sequence and another image sequence; and
converting at least one of the indications of one or more sequence transition points to level of detail parameter, wherein the level of detail parameter corresponds to a sequence transition point, thereby defining a desired transition between one version of the object and another version of the object, wherein the level of detail parameter values are adapted to be used to select at least one of the plurality of versions of the object.

23. The non-transitory computer-readable storage medium of claim 22, wherein presenting the image sequences to the user comprises displaying each of the image sequences as an animation.

24. The non-transitory computer-readable storage medium of claim 23, further comprising:
receiving user input while presenting the image sequences to the user; and
modifying the animation of the image sequences in response to the user input.

25. The non-transitory computer-readable storage medium of claim 24, further comprising pausing the animation in response to a user input.

26. The non-transitory computer-readable storage medium of claim 24, further comprising stepping through the animation in response to a user input.

27. The non-transitory computer-readable storage medium of claim 24, further comprising:
displaying at least a portion of a first one of the plurality of image sequences corresponding with a first one of the plurality of versions of the object;
displaying at least a portion of a second one of the plurality of image sequences corresponding with a second one of the plurality of versions of the object in response to the user input, wherein at least one image of each of the portions of the first and second ones of the image sequences are associated with the same level of detail parameter value.

28. The non-transitory computer-readable storage medium of claim 23, further comprising:
in response to receiving the indication of one or more sequence transition points from the user, presenting a composite image sequence to the user, wherein the composite image sequence includes a first portion of a first one of the image sequences corresponding with a first one of the plurality of versions of the object and a second portion of a second one of the image sequences corresponding with a second one of the plurality of versions of the object, wherein the first and second portions are specified by the indication of one or more sequence transition points.

29. The non-transitory computer-readable storage medium of claim 22, wherein converting comprises:
   identifying images in the image sequences specified by the indication of one or more sequence transition points; and
   determining the level of detail parameter values associated with each identified image.

30. The non-transitory computer-readable storage medium of claim 29, wherein the level of detail parameter value associated with each identified image is related to a position of the identified image in its image sequence.

31. The non-transitory computer-readable storage medium of claim 29, wherein the level of detail parameter value associated with each identified image is related to content of the identified image.

32. The non-transitory computer-readable storage medium of claim 29, wherein determining a level of detail parameter value associated with each image comprises comparing images of at least two versions of the object corresponding with the indication of one or more sequence transition points to calibrate a level of detail quality metric.

33. The non-transitory computer-readable storage medium of claim 29, wherein the level of detail parameter value of each image is related to the proportion of the image covered by an approximation of the associated version of the object in the image.

34. The non-transitory computer-readable storage medium of claim 29, wherein the level of detail parameter value of each image is related to the proportion of the image covered by the associated version of the object in the image.

35. The non-transitory computer-readable storage medium of claim 29, wherein the level of detail parameter value of each image is related to a distance from the associated version of the object to a predetermined location.

36. The method of claim 35, wherein the distance is defined from a point on the associated version of the object to a camera location associated with the view in the image.

37. The non-transitory computer-readable storage medium of claim 22, wherein the level of detail parameter values are adapted to direct a renderer to select one of the plurality of versions of the object for rendering.

38. The non-transitory computer-readable storage medium of claim 22, wherein the level of detail parameter values are adapted to direct a renderer to blend two or more of the plurality of versions of the object.

39. The non-transitory computer-readable storage medium of claim 22, wherein the level of detail parameter values specify at least one blending region.

40. The non-transitory computer-readable storage medium of claim 22, wherein the level of detail parameter values are adapted to be used by a renderer in conjunction with a desired level of detail value to select at least one of the plurality of versions of the object for rendering.

41. The non-transitory computer-readable storage medium of claim 40, wherein the level of detail parameter values specify at least one input parameter to a function specifying the appearance of at least one of the plurality of versions of the object.

42. The non-transitory computer-readable storage medium of claim 22, wherein the level of detail parameter values are adapted to be used by a simulation system in conjunction with a desired level of detail value to select at least one of the plurality of versions of the object for simulation.

* * * * *

UNITED STATES PATENT AND TRADEMARK OFFICE
CERTIFICATE OF CORRECTION

PATENT NO.        : 8,281,281 B1
APPLICATION NO.   : 11/521644
DATED             : October 2, 2012
INVENTOR(S)       : Eliot Smyrl It is certified that error appears in the above-identified patent and that said Letters Patent is hereby corrected as shown below:

In the Claims:
Claim 22, Column 10, Line 22, delete:
"sequence transition points to level of detail"
and insert:
--sequence transition points to a level of detail--

Signed and Sealed this
Twenty-second Day of October, 2013

Teresa Stanek Rea
*Deputy Director of the United States Patent and Trademark Office*